(12) United States Patent
Lin et al.

(10) Patent No.: US 8,525,774 B2
(45) Date of Patent: Sep. 3, 2013

(54) LIGHT-EMITTING DIODE (LED) DRIVING CIRCUIT

(75) Inventors: Li-Wei Lin, Zhonghe (TW);
Chen-Chiang Lee, Zhonghe (TW);
Chi-Hsin Lee, Zhonghe (TW);
Wen-Ming Lin, Zhonghe (TW);
Chun-Chi Liao, Zhonghe (TW);
Yuan-Po Huang, Zhonghe (TW)

(73) Assignee: Top Victory Investments Ltd., Harbour (HK)

( * ) Notice: Subject to any disclaimer, the term of this patent is extended or adjusted under 35 U.S.C. 154(b) by 383 days.

(21) Appl. No.: 12/913,837

(22) Filed: Oct. 28, 2010

(65) Prior Publication Data
US 2011/0096055 A1    Apr. 28, 2011

(30) Foreign Application Priority Data

Oct. 28, 2009  (TW) ................................ 98136410 A
Nov. 11, 2009  (TW) ................................ 98138314 A (51) Int. Cl.
*G09G 3/36*    (2006.01)
*G09G 3/10*    (2006.01)

(52) U.S. Cl.
USPC .......................... 345/102; 345/211; 315/169.3

(58) Field of Classification Search
USPC ....... 345/30, 39, 42, 46, 48, 51–54, 204–215, 345/87, 90, 94–102; 315/160–176; 362/97.1–97.2
See application file for complete search history.

(56) References Cited

U.S. PATENT DOCUMENTS

| 6,864,641 | B2 * | 3/2005 | Dygert | 315/216 |
|---|---|---|---|---|
| 6,982,527 | B2 * | 1/2006 | Lee et al. | 315/224 |
| 7,675,240 | B2 * | 3/2010 | Yang et al. | 315/192 |
| 7,683,553 | B2 * | 3/2010 | Fong | 315/185 R |
| 7,884,557 | B2 * | 2/2011 | Steele et al. | 315/306 |
| 2003/0025120 | A1 * | 2/2003 | Chang | 257/92 |
| 2005/0093473 | A1 * | 5/2005 | Yeh et al. | 315/185 R |
| 2006/0049782 | A1 * | 3/2006 | Vornsand et al. | 315/312 |
| 2007/0114951 | A1 * | 5/2007 | Tsen et al. | 315/291 |
| 2007/0223391 | A1 * | 9/2007 | Lee et al. | 315/82 |
| 2008/0198299 | A1 * | 8/2008 | Choi et al. | 349/68 |
| 2009/0085489 | A1 * | 4/2009 | Chang et al. | 315/193 |
| 2009/0109168 | A1 * | 4/2009 | Lee et al. | 345/102 |
| 2009/0153066 | A1 * | 6/2009 | Yang et al. | 315/192 |
| 2009/0225021 | A1 * | 9/2009 | Ye et al. | 345/102 |
| 2009/0261743 | A1 * | 10/2009 | Chen et al. | 315/192 |

(Continued)

*Primary Examiner* — Amr Awad
*Assistant Examiner* — Roberto Flores
(74) *Attorney, Agent, or Firm* — Alan Kamrath; Kamrath IP Lawfirm, P.A.

(57) ABSTRACT

A light-emitting diode (LED) driving circuit for driving a plurality of first lightbars and a plurality of second lightbars includes a first current mirror, a second current mirror and a control circuit. The first current mirror, if enabled, balances current among the first lightbars. The second current mirror, if enabled, balances current among the second lightbars. During a first period, the control circuit disables the second current mirror and adjusts the duration of enabling the first current mirror according to a dimming signal. During a second period, the control circuit disables the first current mirror and adjusts the duration of enabling the second current mirror according to the dimming signal. Therefore, only first or second lightbars are driven in each period.

3 Claims, 8 Drawing Sheets

(56) References Cited

U.S. PATENT DOCUMENTS

| | | | |
|---|---|---|---|
| 2009/0295776 A1* | 12/2009 | Yu et al. | 345/212 |
| 2009/0322235 A1* | 12/2009 | Shiu et al. | 315/185 R |
| 2009/0322252 A1* | 12/2009 | Shiu et al. | 315/297 |
| 2010/0001663 A1* | 1/2010 | Wu et al. | 315/308 |
| 2010/0072898 A1* | 3/2010 | Ohashi et al. | 315/127 |
| 2010/0109537 A1* | 5/2010 | Nishino et al. | 315/185 R |
| 2010/0141163 A1* | 6/2010 | Ye et al. | 315/189 |
| 2010/0148679 A1* | 6/2010 | Chen et al. | 315/185 R |

* cited by examiner

LIGHT-EMITTING DIODE (LED) DRIVING CIRCUIT

CROSS-REFERENCE TO RELATED APPLICATIONS

The present application claims the priority benefit of Taiwan application serial no. 98136410, filed on Oct. 28, 2009, and Taiwan application serial no. 98138314, filed on Nov. 11, 2009, the contents of which are hereby incorporated by reference herein in their entireties.

BACKGROUND OF THE INVENTION

1. Field of the Invention

The present invention relates to a light-emitting diode (LED) driving circuit. More particularly, the present invention relates to an LED driving circuit for driving a plurality of lightbars each including a plurality of LEDs coupled in series.

2. Description of the Prior Art

Figure 1:
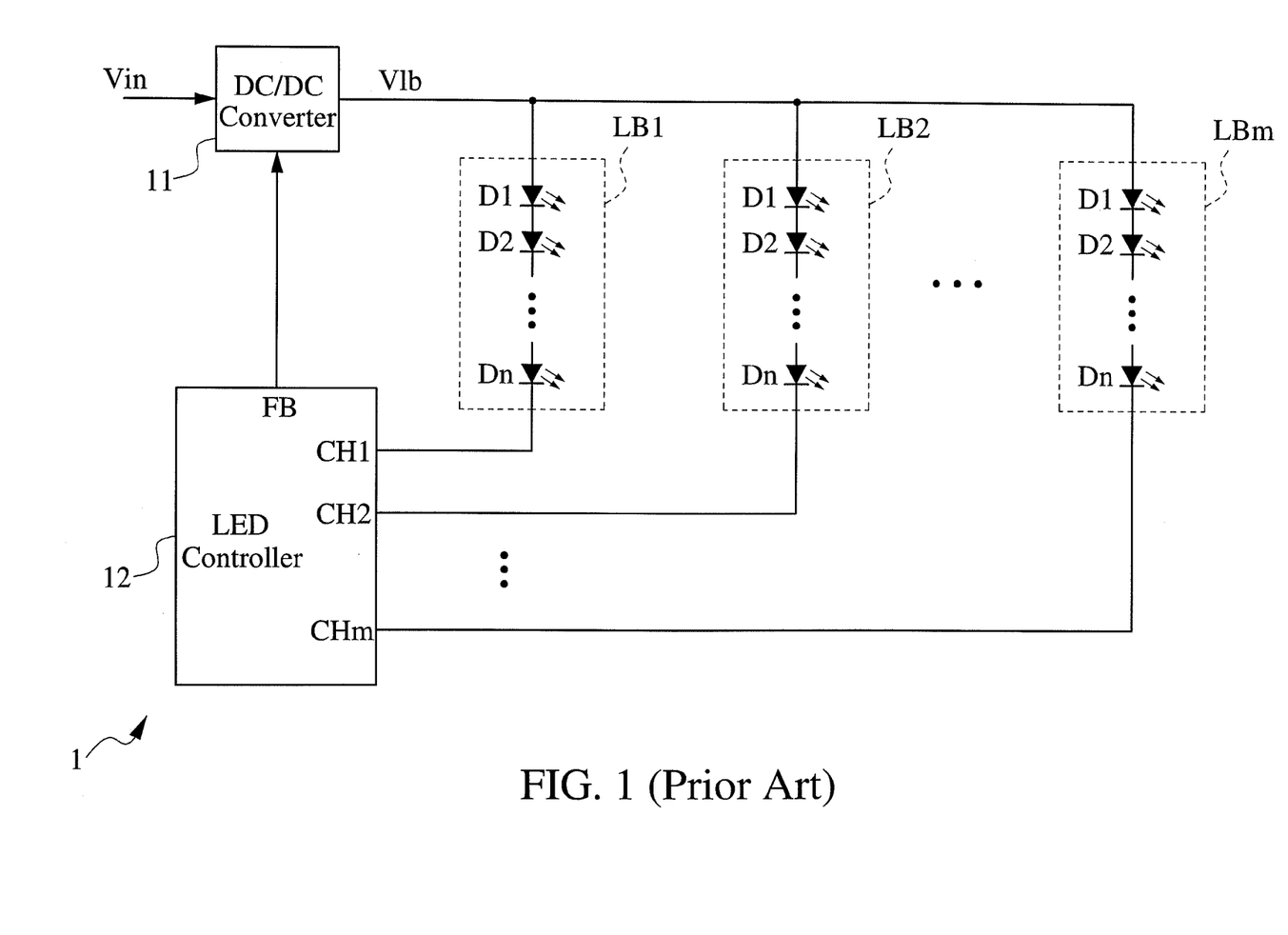
FIG. 1 is a block diagram illustrating a conventional LED driving circuit.

FIG. 1 is a block diagram illustrating a conventional LED driving circuit. Referring to FIG. 1, an LED driving circuit 1 is adapted to drive a plurality of lightbars LB1-LBm, with each lightbar LBi including a plurality of LEDs D1-Dn coupled in series, where m and n are positive integers, and i is an integer from 1 to m. The LED driving circuit 1 includes a direct-current to direct-current (DC/DC) converter 11 and an LED controller 12. The DC/DC converter 11, such as a buck or boost converter converts a DC input voltage Vin to a DC voltage V1b sufficient to drive the lightbars LB1-LBm. Each lightbar LBi has a first terminal coupled to the DC/DC converter 11 to receive the DC voltage V1b and a second terminal coupled to a corresponding channel terminal CHi of the LED controller 12. The LED controller 12 detects current of each lightbar LBi and controls current of each lightbar LBi to become equal to a predetermined value by built-in constant current sources or variable resistors. That is, the LED controller 12 balances currents of the lightbars LB1-LBm. The LED controller 12 further outputs a feedback signal from a feedback terminal FB to control the DC/DC converter 11 to adjust the DC voltage V1b.

Figure 2:
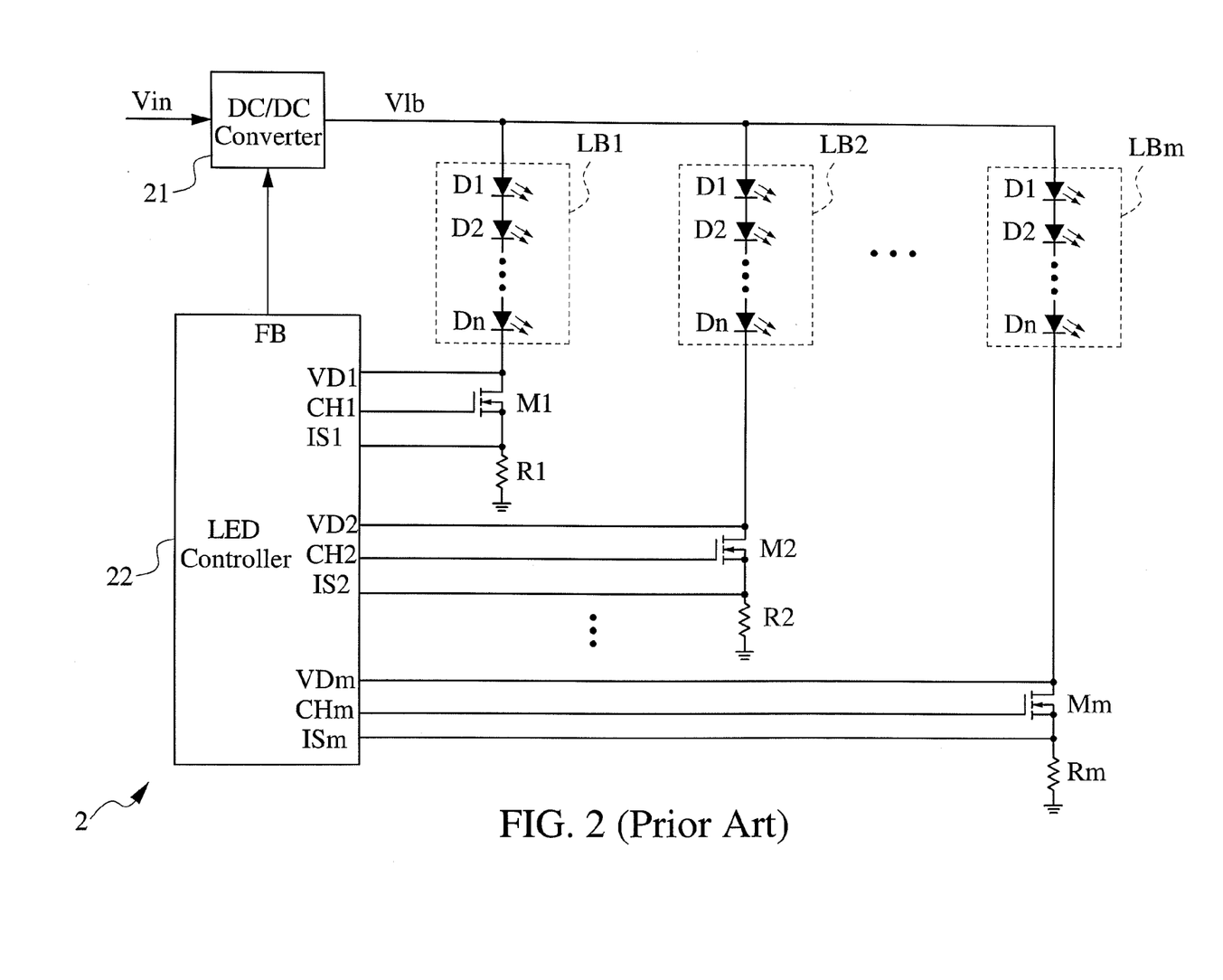
FIG. 2 is a block diagram illustrating another conventional LED driving circuit.

FIG. 2 is a block diagram illustrating another conventional LED driving circuit. Referring to FIG. 2, if too many lightbars LB1-LBm or LEDs D1-Dn with high brightness are employed, the total current of the lightbars LB1-LBm may cause the LED controller to be destroyed. Accordingly, there is a need for an LED driving circuit to employ an external control manner shown in FIG. 2. An LED driving circuit 2 includes a DC/DC converter 21, an LED controller 22, a plurality of transistors M1-Mm and a plurality of resistors R1-Rm. The transistor Mi and the resistor Ri are coupled in series between the second terminal of a corresponding lightbar LBi and ground. The LED controller 22 detects current of each lightbar LBi from a corresponding current sensing terminal ISi and outputs a signal from a corresponding channel terminal CHi to control current of each lightbar LBi to become equal to a predetermined value. The LED controller 22 further detects a voltage at the second terminal of each lightbar LBi from a voltage detecting terminal VDi to provide a short protection for the lightbars LB1-LBm.

The LED driving circuits 1 and 2 employ the LED controllers 12 and 22 which are specific-purpose integrated circuits (ICs). However, a commercially available LED controller IC supports a fixed number of lightbars. It may be necessary to employ a plurality of LED controller ICs to drive the lightbars as the number of the lightbars increases. The number of the transistors M1-Mm and the resistors R1-Rm employed in the LED driving circuit 2 will increase as the number of the lightbars increases. Therefore, as the number of the lightbars increases, the conventional LED driving circuits become more complex and expensive to design and manufacture.

SUMMARY OF THE INVENTION

It is therefore an object of the present invention to provide an LED driving circuit employing a simple driving structure with reduced components and without using a specific-purpose LED controller IC.

The present invention provides an LED driving circuit for driving a plurality of first lightbars and a plurality of second lightbars. Each of the first and second lightbars includes a plurality of LEDs coupled in series. Each of the first and second lightbars has a first terminal coupled to receive a direct-current (DC) voltage and a second terminal. The LED driving circuit includes a first current mirror, a second current mirror and a control circuit. The first current mirror coupled to the second terminals of the first lightbars balances current among the first lightbars when the first current mirror is enabled, and causes current of the first lightbars to become zero when the first current mirror is disabled. The second current mirror coupled to the second terminals of the second lightbars balances current among the second lightbars when the second current mirror is enabled, and causes current of the second lightbars to become zero when the second current mirror is disabled. The control circuit coupled to the first and second current mirrors, during a first period, disables the second current mirror and adjusts the duration of enabling the first current mirror according to a dimming signal; and, during a second period, disables the first current mirror and adjusts the duration of enabling the second current mirror according to the dimming signal. The first and second periods are repeated alternatively.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Figure 3:
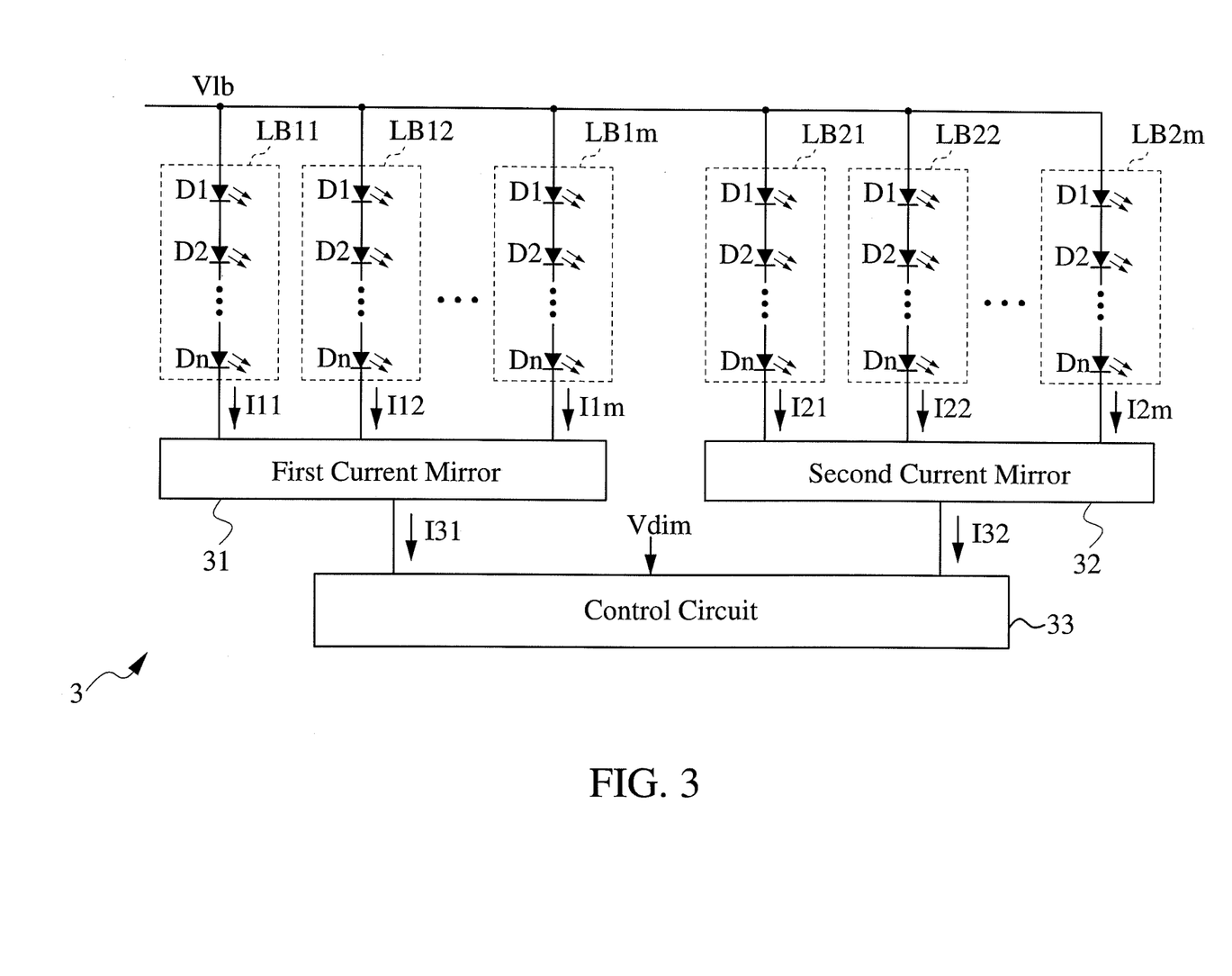
FIG. 3 is a block diagram illustrating an LED driving circuit according to the present invention.

FIG. 3 is a block diagram illustrating an LED driving circuit 3 according to the present invention. Referring to FIG. 3, an LED driving circuit 3 is adapted to drive a plurality of first lightbars LB11-LB1$m$ and a plurality of second lightbars LB21-LB2$m$, where m is a positive integer. Each of the first lightbars LB11-LB1$m$ and the second lightbars LB21-LB2$m$ includes a plurality of LEDs D1-Dn coupled in series, where n is a positive integer. Each of the first lightbars LB11-LB1$m$ and the second lightbars LB21-LB2$m$ has a first terminal coupled to receive a DC voltage V1$b$ and a second terminal. The DC voltage V1$b$, for example, is provided by the DC/DC converter 11 shown in FIG. 1.

The LED driving circuit 3 includes a first current mirror 31, a second current mirror 32 and a control circuit 33. The first current mirror 31 is coupled to the second terminals of the first lightbars LB11-LB1$m$. The first current mirror 31 is adapted to balance current among the first lightbars LB11-LB1$m$ when the first current mirror 31 is enabled, and cause current of the first lightbars LB11-LB1$m$ to become zero when the first current mirror 31 is disabled. The second current mirror 32 is coupled to the second terminals of the second lightbars LB21-LB2$m$. The second current mirror 32 is adapted to balance current among the second lightbars LB21-LB2$m$ when the second current mirror 32 is enabled, and cause current of the second lightbars LB21-LB2$m$ to become zero when the second current mirror 32 is disabled. The control circuit 33 is coupled to the first current mirror 31 and the second current mirror 32. During a first period, the control circuit 33 disables the second current mirror 32 and adjusts the duration of enabling the first current mirror 31 according to a dimming signal Vdim. During a second period, the control circuit 33 disables the first current mirror 31 and adjusts the duration of enabling the second current mirror 32 according to the dimming signal Vdim. The first and second periods are repeated alternatively.

Figure 4:
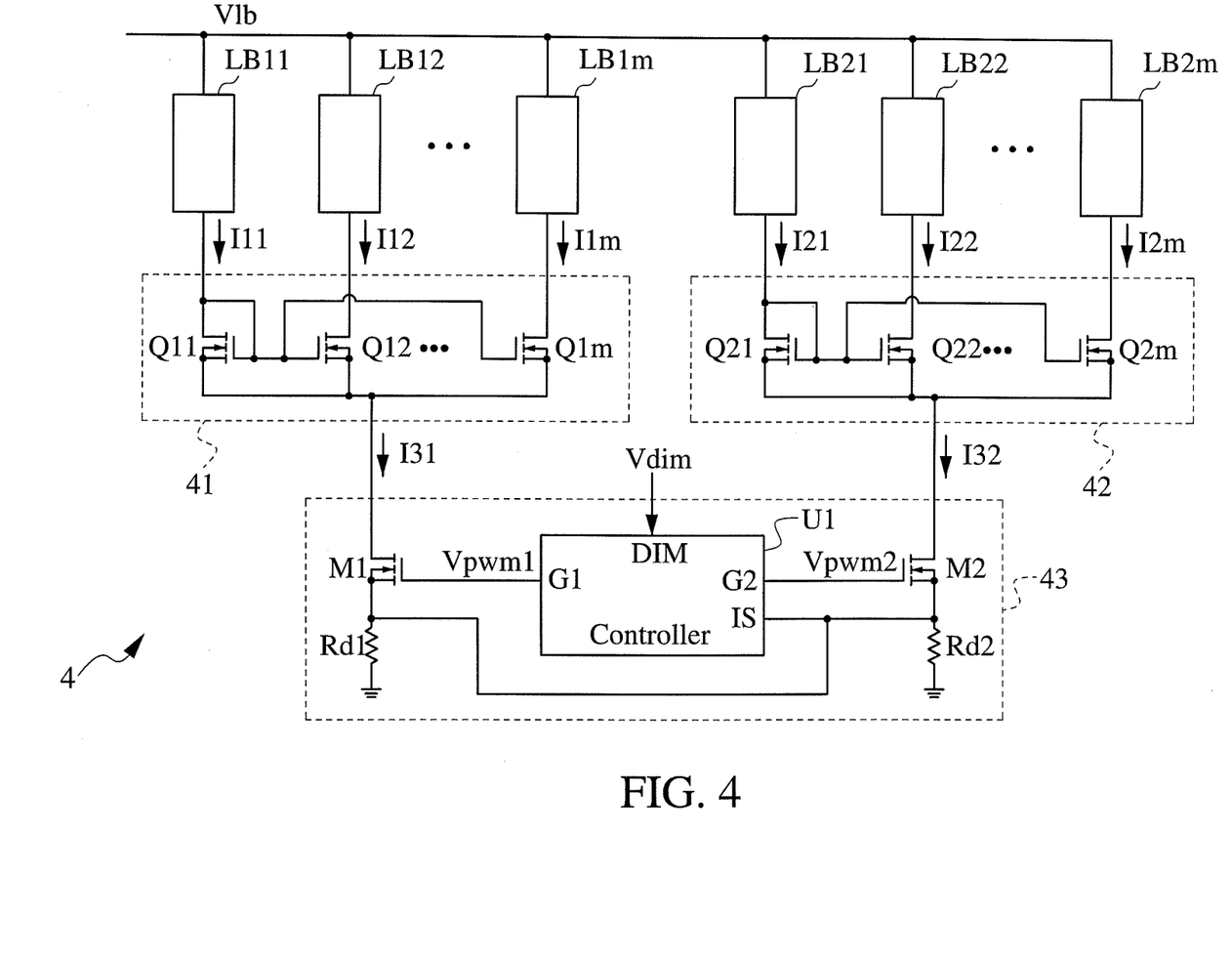
FIG. 4 is a schematic diagram illustrating a first embodiment of the LED driving circuit shown in FIG. 3.

FIG. 4 is a schematic diagram illustrating a first embodiment of the LED driving circuit 4 shown in FIG. 3. Referring to FIG. 4, an LED driving circuit 4 includes a first current mirror 41, a second current mirror 42 and a control circuit 43. The first current mirror 41 includes a plurality of first transistors Q11-Q1$m$. Each first transistor Q1$i$ has a first terminal, a second terminal and a control terminal, where i is an integer from 1 to m. The first terminal of each first transistor Q1$i$ is coupled to the second terminal of a corresponding first lightbar LB1$i$. The second terminals of the first transistors Q11-Q1$m$ are coupled to one another and to the control circuit 43. The control terminals of the first transistors Q11-Q1$m$ are coupled to one another and to the first terminal of one of the first transistors Q11-Q1$m$ (e.g. Q11). The second current mirror 42 includes a plurality of second transistors Q21-Q2$m$. Each second transistor Q2$i$ has a first terminal, a second terminal and a control terminals terminal. The first terminal of each second transistor Q2$i$ is coupled to the second terminal of a corresponding second lightbar LB2$i$. The second terminals of the second transistors Q21-Q2$m$ are coupled to one another and to the control circuit 43. The control terminals of the second transistors Q21-Q2$m$ are coupled to one another and to the first terminal of one of the second transistors Q21-Q2$m$ (e.g. Q21). The first transistors Q11-Q1$m$ and the second transistors Q21-Q2$m$ are matched to one another.

The control circuit 43 includes a controller U1, a first switch M1, a first current detector Rd1, a second switch M2 and a second current detector Rd2. The controller U1 outputs a first pulse-width modulation (PWM) signal Vpwm1 and a second PWM signal Vpwm2. A duty cycle of the first PWM signal Vpwm1 is determined by the dimming signal Vdim and the total current I31 of the first lightbars LB11-LB1$m$, and a duty cycle of the second PWM signal Vpwm2 is determined by the dimming signal Vdim and the total current I32 of the second lightbars LB21-LB2$m$. The first switch M1 has a first terminal coupled to the second terminals of the first transistors Q11-Q1$m$, a second terminal and a control terminal coupled to receive the first PWM signal Vpwm1. The first current detector Rd1 has a first terminal coupled to the second terminal of the first switch M1 and the controller U1 and a second terminal coupled to ground. The first current detector Rd1 detects the total current I31 of the first lightbars LB11-LB1$m$. The second switch M2 has a first terminal coupled to the second terminals of the second transistors Q21-Q2$m$, a second terminal and a control terminal coupled to receive the second PWM signal Vpwm2. The second current detector Rd2 has a first terminal coupled to the second terminal of the second switch M2 and the controller U1 and a second terminal coupled to ground. The second current detector Rd2 detects the total current I32 of the second lightbars LB21-LB2$m$.

In this embodiment, the controller U1 is a general-purpose PWM controller IC such as TL494 or OZ9938. The controller U1 has a dimming terminal DIM, output terminals G1 and G2 and a current sensing terminal IS. The controller U1 receives the dimming signal Vdim from the dimming terminal DIM, obtains the detection result of the total current I31 of the first lightbars LB11-LB1$m$ and the total current I32 of the second lightbars LB21-LB2$m$ from the current sensing terminal IS, and outputs the first PWM signal Vpwm1 and the second PWM signal Vpwm2 from the output terminals G1 and G2. The first transistors Q11-Q1$m$ and the second transistors Q21-Q2$m$ are N-channel field-effect transistors (FETs). The first switch M1 and the second switch M2 are implemented by N-channel FETs. The first current detector Rd1 and the second current detector Rd2 are implemented by resistors. In an alternative embodiment, the first transistors Q11-Q1$m$ and the second transistors Q21-Q2$m$ are NPN bipolar junction transistors (BJTs), and the first switch M1 and the second switch M2 are implemented by NPN BJTs.

Figure 5:
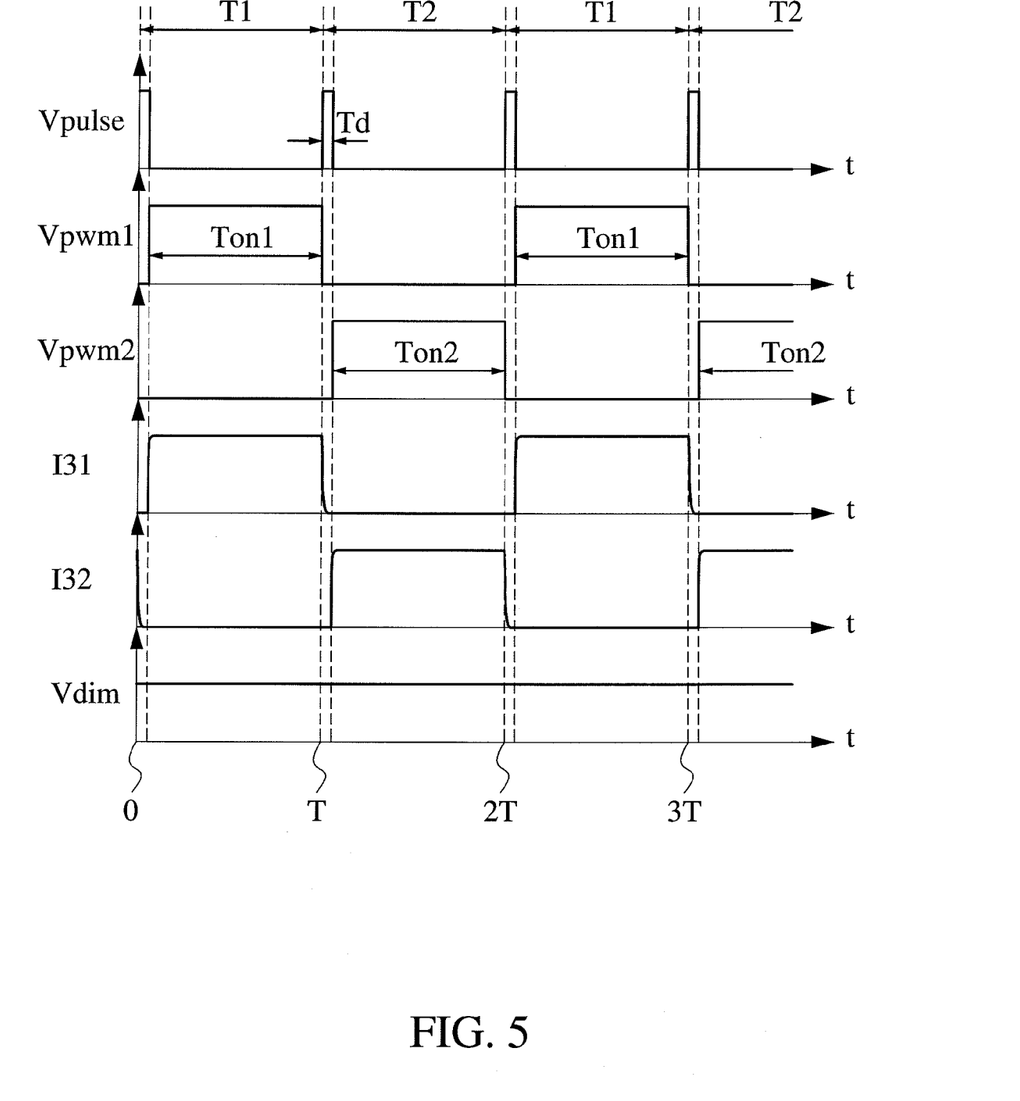
FIG. 5 is a timing diagram illustrating a time division control of the LED driving circuit shown in FIG. 4 under maximum brightness.

FIG. 5 is a timing diagram illustrating time division control of the LED driving circuit shown in FIG. 4 under maximum brightness. Referring to FIG. 5, a pulse signal Vpulse generated by an internal oscillator (not shown) of the controller U1 serves as an operating frequency of the controller U1. Time can be divided into a plurality of periods each having a duration T. Each period includes a pulse having a duration (or pulse width) of Td, where Td is much less than T. These pulses are adapted to avoid overlap between the first PWM signal Vpwm1 and the second PWM signal Vpwm2 so that the first lightbars LB11-LB1$m$ are turned on when the second lightbars LB21-LB2$m$ are turned off, and the first lightbars LB11-LB1$m$ are turned off when the second lightbars LB21-LB2$m$ are turned on. It is defined that odd periods are first periods T1 and that even periods are second periods T2. Hence, the first period T1 and the second period T2 are repeated alternatively.

During a first period T1, the second PWM signal Vpwm2 remains always at low level and controls the second switch M2 to be open to disable the second current mirror 42, and then, the disabled second current mirror 42 controls the second lightbars LB21-LB2$m$ to be turned off. The first PWM signal Vpwm1 is at high level except in the interval from j×2T to (j×2T+Td), where j is a non-negative integer. The first PWM signal Vpwm1 at high level of a duration Ton1 controls the first switch M1 to be closed to enable the first current mirror 41, and then, the enabled first current mirror 41 controls the first lightbars LB11-LB1$m$ to be turned on and balances currents I11-I1m of the first lightbars LB11-LB1m. The first PWM signal Vpwm1 at low level of a duration Td controls the first switch M1 to be open to disable the first current mirror 41, and, then, the disabled first current mirror 41 controls the first lightbars LB11-LB1m to be turned off. The duty cycle of the first PWM signal Vpwm1, Ton1/2T, will be adjusted by the controller U1 according to the dimming signal Vdim and the total current I31 of the first lightbars LB11-LB1m. That is, the duration of enabling the first current mirror 41 or the duration of the first PWM signal Vpwm1 at high level, Ton1, will be adjusted.

During a second period T2, the first PWM signal Vpwm1 remains always at low level and controls the first switch M1 to be open to disable the first current mirror 41, and, then, the disabled first current mirror 41 controls the first lightbars LB11-LB1 in to be turned off. The second PWM signal Vpwm2 is at high level except in the interval from (2j+1)×T to ((2j+1)×T+Td). The second PWM signal Vpwm2 at high level of a duration Ton2 controls the second switch M2 to be closed to enable the second current mirror 42, and, then, the enabled second current mirror 42 controls the second lightbars LB21-LB2m to be turned on and balances currents I21-I2m of the second lightbars LB21-LB2m. The second PWM signal Vpwm2 at low level of a duration Td controls the second switch M2 to be open to disable the second current mirror 42, and then, the disabled second current mirror 42 controls the second lightbars LB21-LB2m to be turned off. The duty cycle of the second PWM signal Vpwm2, Ton2/2T, will be adjusted by the controller U1 according to the dimming signal Vdim and the total current I32 of the second lightbars LB21-LB2m. That is, the duration of enabling the second current mirror 42 or the duration of the second PWM signal Vpwm2 at high level, Ton2, will be adjusted.

In this embodiment, the dimming signal Vdim is a DC signal whose magnitude influences the duty cycles of the first PWM signal Vpwm1 and the second PWM signal Vpwm2. In an alternative embodiment, the dimming signal Vdim is a PWM signal whose duty cycle influences the duty cycles of the first PWM signal Vpwm1 and the second PWM signal Vpwm2.

Figure 6:
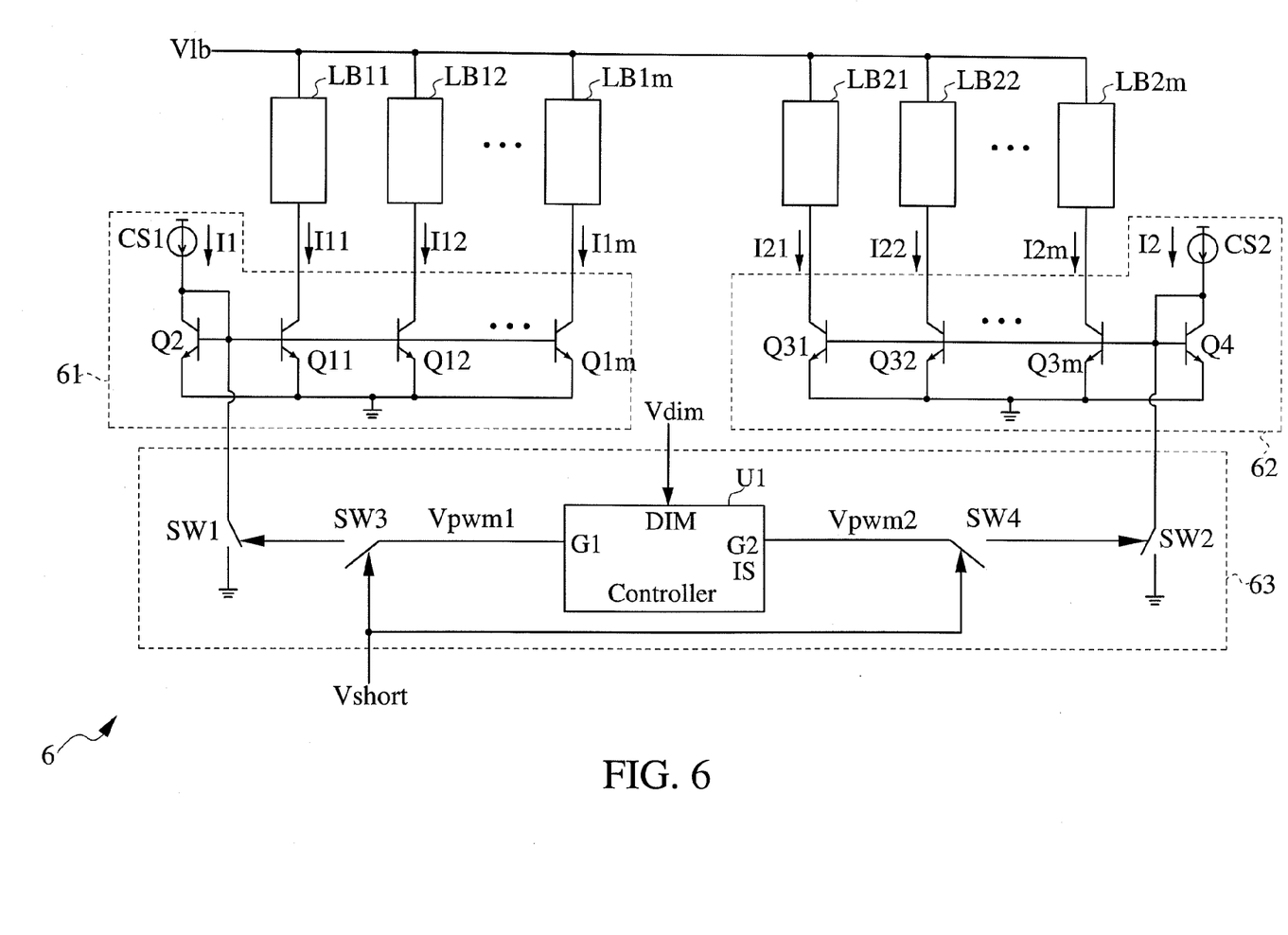
FIG. 6 is a schematic diagram illustrating a second embodiment of the LED driving circuit shown in FIG. 3.

FIG. 6 is a schematic diagram illustrating a second embodiment of the LED driving circuit shown in FIG. 3. Referring to FIG. 6, an LED driving circuit 6 includes a first current mirror 61, a second current mirror 62 and a control circuit 63. The first current mirror 61 includes a first constant current source CS1, a plurality of first transistors Q11-Q1m and a second transistor Q2. The first constant current source CS1 provides a first constant current I1. Each of the first transistors Q11-Q1m and the second transistor Q2 has a first terminal, a second terminal and a control terminals terminal. The first terminal of each first transistor Q1i is coupled to the second terminal of a corresponding first lightbar LB1i. The second terminals of the first transistors Q11-Q1m and the second transistor Q2 are coupled to one another and to ground. The control terminals of the first transistors Q11-Q1m and the second transistor Q2 are coupled to one another and to the first terminal of the second transistor Q2, the first constant current source CS1 and the control circuit 63. The first transistors Q11-Q1m and the second transistor Q2 are matched to one another. The second current mirror 62 includes a second constant current source CS2, a plurality of third transistors Q31-Q3m and a fourth transistor Q4. The second constant current source CS2 provides a second constant current I2 having the same magnitude as the first constant current I1. Each of the third transistors Q31-Q3m and the fourth transistor Q4 has a first terminal, a second terminal and a control terminal. The first terminal of each third transistor Q3i is coupled to the second terminal of a corresponding second lightbar LB2i. The second terminals of the third transistors Q31-Q3m and the fourth transistor Q4 are coupled to one another and to ground. The control terminals of the third transistors Q31-Q3m and the fourth transistor Q4 are coupled to one another and to the first terminal of the fourth transistor Q4, the second constant current source CS2 and the control circuit 63. The third transistors Q31-Q3m and the fourth transistor Q4 are matched to one another. In this embodiment, the first transistors Q11-Q1m, the second transistor Q2, the third transistors Q31-Q3m and the fourth transistor Q4 are NPN BJTs. In an alternative embodiment, the first transistors Q11-Q1m, the second transistor Q2, the third transistors Q31-Q3m and the fourth transistor Q4 are N-channel FETs.

The control circuit 63 includes a controller U1, a first switch unit SW1 and a second switch unit SW2. The controller U1 outputs a first PWM signal Vpwm1 and a second PWM signal Vpwm2. Duty cycles of the first PWM signal Vpwm1 and the second PWM signal Vpwm2 are determined by the dimming signal Vdim. The first switch unit SW1 has a first terminal coupled to the control terminal of the second transistor Q2, a second terminal coupled to ground and a control terminal coupled to receive the first PWM signal Vpwm1. The second switch unit SW2 has a first terminal coupled to the control terminal of the fourth transistor Q4, a second terminal coupled to ground and a control terminal coupled to receive the second PWM signal Vpwm2.

When a short protection mechanism is introduced, the control circuit further 63 further includes a short protection circuit (not shown), a third switch unit SW3 and a fourth switch unit SW4. The short protection circuit coupled to the second terminals of the first lightbars LB11-LB1m and the second lightbars LB21-LB2m outputs a short signal Vshort. The short signal Vshort is valid when a voltage at the second terminal of one of the first lightbars LB11-LB1m and the second lightbars LB21-LB2m is larger than a threshold voltage. Otherwise, the short signal Vshort is invalid when a voltage at the second terminal of one of the first lightbars LB11-LB1m and the second lightbars LB21-LB2m is smaller than the threshold voltage. The third switch unit SW3 has a first terminal coupled to receive the first PWM signal Vpwm1, a second terminal coupled to the control terminal of the first switch unit SW1 and a control terminal coupled to receive the short signal Vshort. The third switch unit SW3 is open when the short signal Vshort is valid and closed when the short signal Vshort is invalid. The first switch unit SW1 is open or closed according to the first PWM signal Vpwm1 when the third switch unit SW3 is closed, and the first switch unit SW1 is closed when the third switch unit SW3 is open. The fourth switch unit SW4 has a first terminal coupled to receive the second PWM signal Vpwm2, a second terminal coupled to the control terminal of the second switch unit SW2 and a control terminal coupled to receive the short signal Vshort. The fourth switch unit SW4 is open when the short signal Vshort is valid and closed when the short signal Vshort is invalid. The second switch unit SW2 is open or closed according to the second PWM signal Vpwm2 when the fourth switch unit SW4 is closed, and the second switch unit SW2 is closed when the fourth switch unit SW4 is open.

Figure 7:
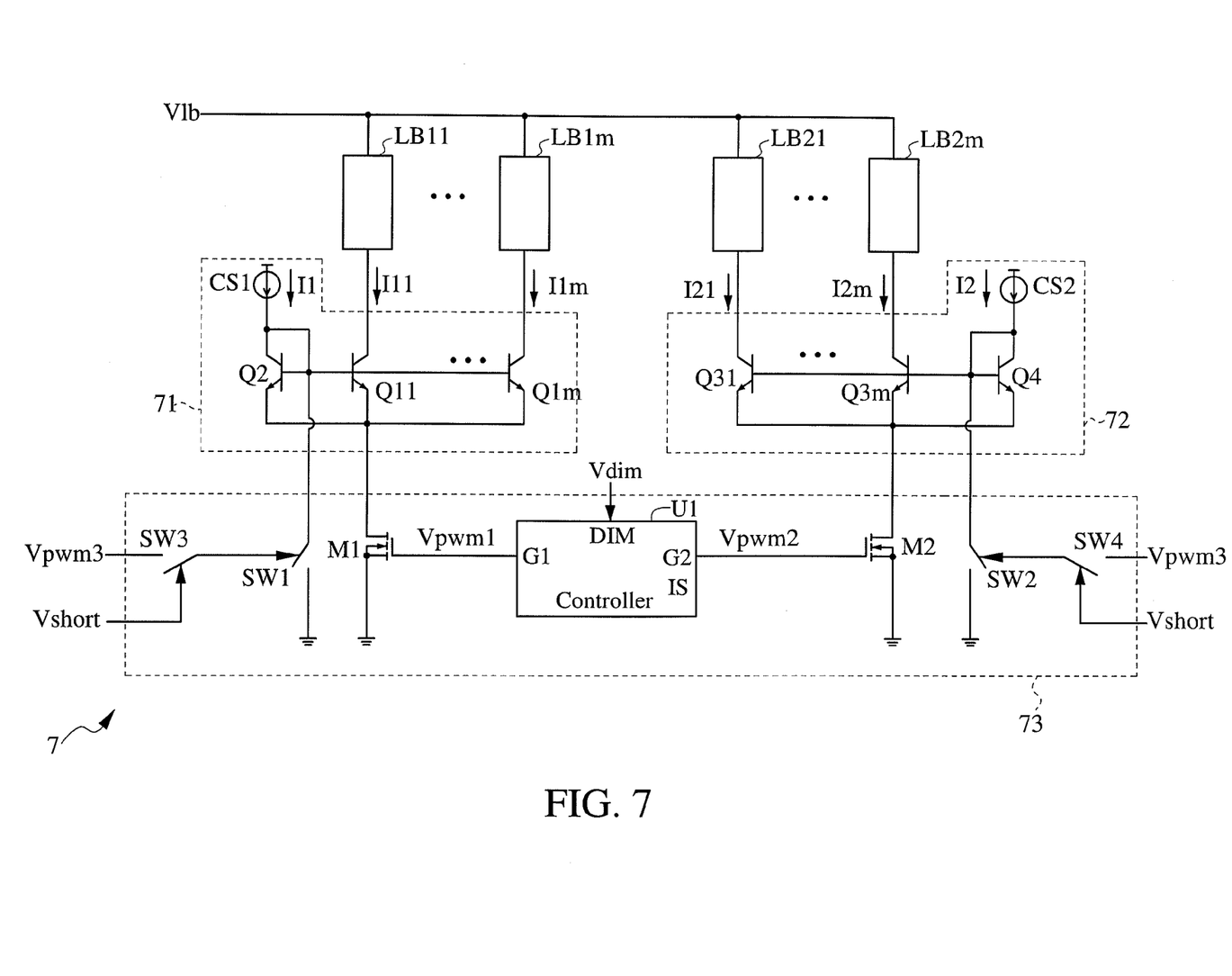
FIG. 7 is a schematic diagram illustrating a third embodiment of the LED driving circuit shown in FIG. 3.

FIG. 7 is a schematic diagram illustrating a third embodiment of the LED driving circuit shown in FIG. 3. Referring to FIG. 7, an LED driving circuit 7 includes a first current mirror 71, a second current mirror 72 and a control circuit 73. The first current mirror 71 includes a first constant current source CS1, a plurality of first transistors Q11-Q1m and a second transistor Q2. The first constant current source CS1 provides a first constant current I1. Each of the first transistors Q11-

Q1$m$ and the second transistor Q2 has a first terminal, a second terminal and a control terminal. The first terminal of each first transistor Q1$i$ is coupled to the second terminal of a corresponding first lightbar LB1$i$. The second terminals of the first transistors Q11-Q1$m$ and the second transistor Q2 are coupled to one another and to the control circuit 73. The control terminals of the first transistors Q11-Q1$m$ and the second transistor Q2 are coupled to one another and to the first terminal of the second transistor Q2, the first constant current source CS1 and the control circuit 73. The first transistors Q11-Q1$m$ and the second transistor Q2 are matched to one another. The second current mirror 72 includes a second constant current source CS2, a plurality of third transistors Q31-Q3$m$ and a fourth transistor Q4. The second constant current source CS2 provides a second constant current I2 having the same magnitude as the first constant current I1. Each of the third transistors Q31-Q3$m$ and the fourth transistor Q4 has a first terminal, a second terminal and a control terminal. The first terminal of each third transistor Q3$i$ is coupled to the second terminal of a corresponding second lightbar LB2$i$. The second terminals of the third transistors Q31-Q3$m$ and the fourth transistor Q4 are coupled to one another and to the control circuit 73. The control terminals of the third transistors Q31-Q3$m$ and the fourth transistor Q4 are coupled to one another and to the first terminal of the fourth transistor Q4, the second constant current source CS2 and the control circuit 73. The third transistors Q31-Q3$m$ and the fourth transistor Q4 are matched to one another.

The control circuit 73 includes a controller U1, a first switch M1, a second switch M2, a first switch unit SW1 and a second switch unit SW2. The controller U1 outputs a first PWM signal Vpwm1 and a second PWM signal Vpwm2. Duty cycles of the first PWM signal Vpwm1 and the second PWM signal Vpwm2 are determined by the dimming signal Vdim. The first switch M1 has a first terminal coupled to the second terminals of the first transistors Q11-Q1$m$ and the second transistor Q2, a second terminal coupled to ground and a control terminal coupled to receive the first PWM signal Vpwm1. The second switch M2 has a first terminal coupled to the second terminals of the third transistors Q31-Q3$m$ and the fourth transistor Q4, a second terminal coupled to ground and a control terminal coupled to receive the second PWM signal Vpwm2. The first switch unit SW1 has a first terminal coupled to the control terminal of the second transistor Q2, a second terminal coupled to ground and a control terminal coupled to receive a third PWM signal Vpwm3. The second switch unit SW2 has a first terminal coupled to the control terminal of the fourth transistor Q4, a second terminal coupled to ground and a control terminal coupled to receive the third PWM signal Vpwm3.

When a short protection mechanism is introduced, the control circuit further 73 further includes a short protection circuit (not shown), a third switch unit SW3 and a fourth switch unit SW4. The short protection circuit is described above. The third switch unit SW3 has a first terminal coupled to receive the third PWM signal Vpwm3, a second terminal coupled to the control terminal of the first switch unit SW1 and a control terminal coupled to receive the short signal Vshort. The third switch unit SW3 is open when the short signal Vshort is valid and closed when the short signal Vshort is invalid. The first switch unit SW1 is open or closed according to the third PWM signal Vpwm3 when the third switch unit SW3 is closed, and the first switch unit SW1 is closed when the third switch unit SW3 is open. The fourth switch unit SW4 has a first terminal coupled to receive the third PWM signal Vpwm3, a second terminal coupled to the control terminal of the second switch unit SW2 and a control terminal coupled to receive the short signal Vshort. The fourth switch unit SW4 is open when the short signal Vshort is valid and closed when the short signal Vshort is invalid. The second switch unit SW2 is open or closed according to the third PWM signal Vpwm3 when the fourth switch unit SW4 is closed, and the second switch unit SW2 is closed when the fourth switch unit SW4 is open.

Figure 8:
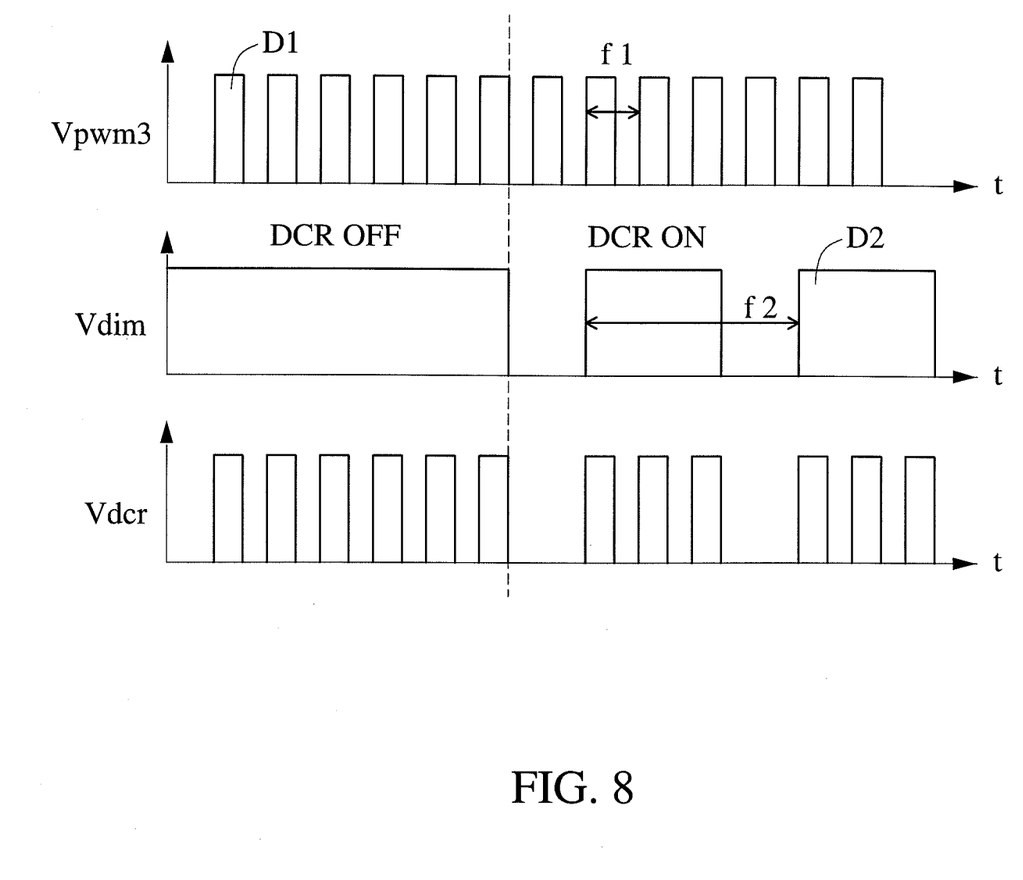
FIG. 8 is a timing diagram illustrating a DCR function control of the LED driving circuit shown in FIG. 7.

FIG. 8 is a timing diagram illustrating DCR function control of the LED driving circuit shown in FIG. 7. Referring to FIG. 8, the LED driving circuit 7 can provide a dynamic contrast ratio (DCR) function. When the DCR function of the LED driving circuit 7 are turned off (DCR Off), the dimming signal Vdim is a DC signal, and the brightness provided by the lightbars LB11-LB1$m$ and LB21-LB2$m$ is determined by a duty cycle D1 of the third PWM signal Vpwm3 with a frequency f1. When the DCR function of the LED driving circuit 7 are turned on (DCR ON), the dimming signal Vdim becomes a PWM signal whose frequency f2 and duty cycle D2 are determined by the brightness of the image displayed on a display device, and the brightness provided by the lightbars LB11-LB1$m$ and LB21-LB2$m$ now is determined by a DCR signal Vdcr which is generated according to the dimming signal Vdim and the third PWM signal Vpwm3.

In summary, the LED driving circuit of the present invention divides all lightbars into the first lightbars and the second lightbars for time division control, and only the first lightbars or the second lightbars are driven in each period. For example, only the first lightbars are driven in the first period, and only the second lightbars are driven in the second period. It reduces the amount of current provided by the DC/DC converter for driving the lightbars in each period. Hence, the DC/DC converter can reduce voltage ripple therein and can employ a smaller value filter capacitor at its output to reduce its cost. In addition, the LED driving circuit of the present invention employs a simple driving structure with reduced components and without using a specific-purpose LED controller IC to reduce its cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. A light-emitting diode (LED) driving circuit for driving a plurality of first lightbars and a plurality of second lightbars, each of the plurality of first and second lightbars comprising a plurality of LEDs coupled in series, each of the first and second lightbars having a first terminal coupled to receive a direct-current (DC) voltage and a second terminal, the LED driving circuit comprising:

a first current mirror coupled to the second terminals of the plurality of first lightbars for balancing current among the plurality of first lightbars when the first current mirror is enabled, and causing current of the plurality of first lightbars to become zero when the first current mirror is disabled, wherein the first current mirror comprises a first constant current source, a plurality of first transistors and a second transistor, the first constant current source providing a first constant current, each of the plurality of first transistors and the second transistor having a first terminal, a second terminal and a control terminal, the first terminal of each first transistor coupled to the second terminal of a corresponding first lightbar;

a second current mirror coupled to the second terminals of the plurality of second lightbars for balancing current among the plurality of second lightbars when the second current mirror is enabled, and causing current of the plurality of second lightbars to become zero when the second current mirror is disabled, wherein the second current mirror comprises a second constant current source, a plurality of third transistors and a fourth transistor, the second constant current source providing a second constant current having the same magnitude as the first constant current, each of the plurality of third transistors and the fourth transistor having a first terminal, a second terminal and a control terminal, the first terminal of each third transistor coupled to the second terminal of a corresponding second lightbar; and a control circuit coupled to the first and second current mirrors for, during a first period, disabling the second current mirror and adjusting the duration of enabling the first current mirror according to a dimming signal; and, during a second period, disabling the first current mirror and adjusting the duration of enabling the second current mirror according to the dimming signal, the first and second periods being repeated alternatively, wherein the second terminals of the plurality of first transistors and the second transistor coupled to one another and to the control circuit, the control terminals of the plurality of first transistors and the second transistor coupled to one another and to the first terminal of the second transistor, the first constant current source and the control circuit, the plurality of first transistors and the second transistor being matched to one another, wherein the second terminals of the plurality of third transistors and the fourth transistor coupled to one another and to the control circuit, the control terminals of the plurality of third transistors and the fourth transistor coupled to one another and to the first terminal of the fourth transistor, the second constant current source and the control circuit, the plurality of third transistors and the fourth transistor being matched to one another, wherein the control circuit comprises:

a controller for outputting first and second pulse-width modulation (PWM) signals, with duty cycles of the first and second PWM signals being determined by the dimming signal;

a first switch having a first terminal coupled to the second terminals of the plurality of first transistors and the second transistor, a second terminal coupled to ground and a control terminal coupled to receive the first PWM signal;

a second switch having a first terminal coupled to the second terminals of the plurality of third transistors and the fourth transistor, a second terminal coupled to ground and a control terminal coupled to receive the second PWM signal;

a first switch unit having a first terminal coupled to the control terminal of the second transistor, a second terminal coupled to ground and a control terminal coupled to receive a third PWM signal;

a second switch unit having a first terminal coupled to the control terminal of the fourth transistor, a second terminal coupled to ground and a control terminal coupled to receive the third PWM signal;

a short protection circuit coupled to the second terminals of the plurality of first and second lightbars for outputting a short signal, the short signal being valid when a voltage at the second terminal of one of the plurality of first and second lightbars is larger than a threshold voltage, the short signal being invalid when a voltage at the second terminal of one of the plurality of first and second lightbars is smaller than the threshold voltage;

a third switch unit having a first terminal coupled to receive the third PWM signal, a second terminal coupled to the control terminal of the first switch unit and a control terminal coupled to receive the short signal, the third switch unit being open when the short signal is valid and closed when the short signal is invalid, the first switch unit being open or closed according to the third PWM signal when the third switch unit is closed, the first switch unit being closed when the third switch unit is open; and a fourth switch unit having a first terminal coupled to receive the third PWM signal, a second terminal coupled to the control terminal of the second switch unit and a control terminal coupled to receive the short signal, the fourth switch unit being open when the short signal is valid and closed when the short signal is invalid, the second switch unit being open or closed according to the third PWM signal when the fourth switch unit is closed, and the second switch unit being closed when the fourth switch unit is open.

2. The LED driving circuit according to claim 1, wherein the plurality of first transistors, the second transistor, the plurality of third transistors and the fourth transistors transistor comprise bipolar junction transistors.

3. The LED driving circuit according to claim 1, wherein the plurality of first transistors, the second transistor, the plurality of third transistors and the fourth transistors transistor comprise field-effect transistors.

* * * * *